US008033041B2

(12) United States Patent
van Riet

(10) Patent No.: US 8,033,041 B2
(45) Date of Patent: Oct. 11, 2011

(54) DISPLAY PANEL TENSIONER AND ASSEMBLIES THEREOF

(75) Inventor: Hano van Riet, Cape Town (ZA)

(73) Assignees: Du Toit Family Trust IT 3452/1998, Western Cape (ZA); Renner Family Trust, Western Cape (ZA)

( * ) Notice: Subject to any disclaimer, the term of this patent is extended or adjusted under 35 U.S.C. 154(b) by 1172 days.

(21) Appl. No.: 11/276,099

(22) Filed: Feb. 14, 2006

(65) Prior Publication Data

US 2007/0191161 A1 Aug. 16, 2007

(51) Int. Cl.
*G09F 17/00* (2006.01)
*F16M 13/00* (2006.01)
*F16H 7/22* (2006.01)

(52) U.S. Cl. ........... 40/603; 474/130; 474/110; 248/560

(58) Field of Classification Search .................. 474/130, 474/101; 40/603; 248/560
See application file for complete search history.

(56) References Cited

U.S. PATENT DOCUMENTS

| | | | | | |
|---|---|---|---|---|---|
| 391,608 | A | * | 10/1888 | Hartwell | 248/449 |
| 1,194,610 | A | * | 8/1916 | Fischer | 40/603 |
| 1,706,596 | A | * | 3/1929 | Sweeney | 40/603 |
| 1,711,085 | A | * | 4/1929 | D Arcy | 248/560 |
| 1,712,756 | A | * | 5/1929 | Dixon | 40/603 |
| 1,713,082 | A | * | 5/1929 | Hoffman | 40/603 |
| 1,787,607 | A | * | 1/1931 | Wlecke et al. | 40/603 |
| 1,842,274 | A | * | 1/1932 | Landwehr et al. | 40/603 |
| 1,870,798 | A | * | 8/1932 | Einson | 40/603 |
| 1,974,076 | A | * | 9/1934 | Lindenberger | 40/603 |
| 2,072,754 | A | * | 3/1937 | Vernon | 40/603 |
| 2,118,135 | A | * | 5/1938 | Baldwin | 40/603 |
| 2,160,456 | A | * | 5/1939 | Evans et al. | 40/603 |
| 2,720,718 | A | * | 10/1955 | Vaniman | 40/603 |
| 2,722,420 | A | * | 11/1955 | Adamson | 273/407 |
| 2,863,236 | A | * | 12/1958 | Stein | 40/311 |
| 3,421,276 | A | * | 1/1969 | Barge | 52/287.1 |
| 3,550,297 | A | * | 12/1970 | Friedrichsen | 40/603 |

(Continued)

FOREIGN PATENT DOCUMENTS

DE 199 33 454 1/2001

(Continued)

OTHER PUBLICATIONS

International Preliminary Report on Patentability and Written Opinion in PCT/IB2004/002607.

*Primary Examiner* — Michael R Mansen
*Assistant Examiner* — Henry Liu
(74) *Attorney, Agent, or Firm* — Banner & Witcoff, Ltd

(57) ABSTRACT

This invention relates to a display panel tensioner whereby a flexible display panel, generally of the type carrying advertising or promotional material, may be supported under tension to thereby provide a smooth and neat appearance that enhances the aesthetics of the display panel. The tensioner comprising a body having attachment formations whereby it may be secured to a support structure, a track formed in the body and receiving an elongate tensioning member that is longitudinally movable along the track between terminal positions with the tensioning member being movable in a plane generally parallel to a plane in which a display panel is to be supported thereby, resilient biasing means urging the tensioning member towards one terminal position thereof relative to the track, and attachment means for releasably attaching a display panel assembly to the tensioning member.

18 Claims, 4 Drawing Sheets

U.S. PATENT DOCUMENTS

| | | | | | |
|---|---|---|---|---|---|
| 3,589,048 | A | * | 6/1971 | Mollet et al. | 40/603 |
| 3,591,940 | A | * | 7/1971 | Slemmons | 40/603 |
| 3,802,286 | A | * | 4/1974 | Winklhofer et al. | 474/111 |
| 3,812,733 | A | * | 5/1974 | Yoshida | 474/111 |
| 3,899,843 | A | * | 8/1975 | Doyle et al. | 40/602 |
| 3,979,846 | A | * | 9/1976 | Euzarraga | 40/603 |
| 4,095,360 | A | * | 6/1978 | Dinan et al. | 40/603 |
| 4,569,143 | A | * | 2/1986 | Bannister | 40/603 |
| 4,574,506 | A | * | 3/1986 | Morgan | 40/603 |
| 4,580,361 | A | * | 4/1986 | Hillstrom et al. | 40/603 |
| 4,700,498 | A | * | 10/1987 | Perutz et al. | 40/603 |
| 4,773,174 | A | * | 9/1988 | Boeniger et al. | 40/792 |
| 4,822,322 | A | * | 4/1989 | Martin | 474/135 |
| 4,832,665 | A | * | 5/1989 | Kadota et al. | 474/112 |
| 4,878,303 | A | * | 11/1989 | Banniza et al. | 40/606.14 |
| 4,959,916 | A | * | 10/1990 | Cochrane | 40/603 |
| 5,030,169 | A | * | 7/1991 | Kiso et al. | 474/110 |
| 5,099,590 | A | * | 3/1992 | Yamaguchi | 40/711 |
| 5,142,804 | A | * | 9/1992 | Hillstrom et al. | 40/603 |
| 5,159,770 | A | * | 11/1992 | Yamaguchi | 40/790 |
| 5,185,677 | A | * | 2/1993 | Honda et al. | 359/460 |
| 5,265,362 | A | * | 11/1993 | Yamaguchi | 40/603 |
| 5,370,584 | A | * | 12/1994 | Todd | 474/110 |
| 5,398,388 | A | * | 3/1995 | Coleman | 24/593.11 |
| 5,601,505 | A | * | 2/1997 | Tada | 474/110 |
| 5,647,157 | A | * | 7/1997 | Kasahara | 40/792 |
| 5,664,354 | A | * | 9/1997 | Daviau et al. | 40/603 |
| 5,700,215 | A | * | 12/1997 | Tada et al. | 474/110 |
| 5,941,001 | A | * | 8/1999 | Dietrich et al. | 40/603 |
| 6,088,942 | A | * | 7/2000 | Brooks et al. | 40/603 |
| 6,093,123 | A | * | 7/2000 | Baddaria et al. | 474/110 |
| 6,120,402 | A | * | 9/2000 | Preston et al. | 474/109 |
| 6,192,611 | B1 | * | 2/2001 | Molla | 40/604 |
| 6,332,284 | B1 | * | 12/2001 | Tafforeau | 40/603 |
| 6,339,889 | B1 | * | 1/2002 | Griesemer et al. | 40/603 |
| 6,463,687 | B1 | | 10/2002 | Dorstewitz | |
| 6,482,116 | B1 | * | 11/2002 | Ullein | 474/111 |
| 6,602,154 | B1 | * | 8/2003 | Guichard et al. | 474/110 |
| 6,612,951 | B2 | * | 9/2003 | Kurohata | 474/109 |
| 6,643,966 | B2 | * | 11/2003 | Schmitt | 40/610 |
| 6,652,401 | B2 | * | 11/2003 | Liu | 474/134 |
| 6,698,123 | B2 | * | 3/2004 | Smith | 40/603 |
| 6,817,958 | B2 | * | 11/2004 | Kaido et al. | 474/101 |
| 6,854,204 | B2 | * | 2/2005 | Uden | 40/603 |
| 6,916,264 | B2 | * | 7/2005 | Hashimoto et al. | 474/109 |
| 7,063,634 | B2 | * | 6/2006 | Hashimoto et al. | 474/110 |
| 2004/0127316 | A1 | * | 7/2004 | Hashimoto et al. | 474/109 |
| 2005/0049093 | A1 | * | 3/2005 | Sato et al. | 474/101 |

FOREIGN PATENT DOCUMENTS

| | | |
|---|---|---|
| GB | 2 274 478 | 7/1994 |
| WO | 2005/015073 A3 | 2/2005 |

* cited by examiner

DISPLAY PANEL TENSIONER AND ASSEMBLIES THEREOF

FIELD OF THE INVENTION

This invention relates to a display panel tensioner whereby a flexible display panel, generally of the type carrying advertising or promotional material, may be supported under tension to thereby provide a smooth and neat appearance that enhances the aesthetics of the display panel. Display panels of this nature are typically made either of a synthetic fabric material or of a fabric or other reinforced plastics sheet, in each case being flexible, at least to the extent to which they can be rolled up, or folded, to a collapsed condition for transport and storage purposes.

The invention also relates to assemblies of tensioners and display panels particularly adapted to be used in association therewith.

BACKGROUND TO THE INVENTION

There are numerous instances in which it is desirable to support a flexible display panel so as to be easily visible by persons in the surrounding area. Display panels frequently deviate from their planned size and shape and such deviations contribute to distortions when the display panels are supported in use. These distortions may evidence themselves in many different forms such as creases and folds that detract from the general legibility of the panel and adversely affect the aesthetic appearance thereof.

The problem, in applicant's view, centres on the inability of most current support devices to hold the flexible panels under a uniform tension in order to display the panel in a smooth and neat condition.

OBJECT OF THE INVENTION

It is accordingly an object of this invention to provide a tensioner and assemblies thereof that facilitate supporting a flexible display panel under tension.

SUMMARY OF THE INVENTION

In accordance with this invention there is provided a tensioner comprising body having attachment formations whereby it may be secured to a support structure, a track formed in the body and receiving an elongate tensioning member that is longitudinally movable along the track between terminal positions with the tensioning member being movable in a plane generally parallel to a plane in which a display panel is to be supported thereby, resilient biasing means urging the tensioning member towards one terminal position thereof relative to the track, and attachment means for releasably attaching a display panel assembly to the tensioning member.

Further features of the invention provide for the elongate tensioning member, in one terminal position thereof, to project outwards from the body whilst in the other terminal position thereof the tensioning member is substantially withdrawn into the body; for the track to extend along substantially the entire length of the body; or the attachment means for releasably attaching a display panel assembly to the tensioning member to be an inwardly lipped socket extending inwards from an operatively outer end of the tensioning member in the general direction of the length thereof; for the resilient biasing means to bias the tensioning member towards said outwardly projecting position relative to the body; and for a manually releasable catch to be provided for arresting the tensioning member in the terminal position relative to the body in which the resilient biasing means urges the tensioning member towards the other terminal position so as to render the tensioning member "spring loaded".

A still further feature of the invention provides for the attachment formations on the body to be adapted to cooperate releasably with a baseplate that, in turn, can be permanently or semi-permanently secured to a support structure.

The invention also provides an assembly of tensioners secured to a support structure in spaced relationship relative to each other so that the tensioning members of the tensioners are orientated so that the spring biasing thereof is directed in a direction away from that of one or more other tensioners so that the combined effect of the tensioners is to place a display panel supported thereby under tension.

The invention still further provides fittings particularly configured for releasable association with the attachment means of the tensioning members and for attachment to a display panel to preferably be by way of a batten extending along an edge of the display panel.

The invention therefore also provides display panels fitted with battens and fittings for association with tensioners as defined above.

In order that the above and other features of the invention may be more fully understood one embodiment of the invention and assemblies embodying same will now be described with reference to the accompanying drawings.

DETAILED DESCRIPTION WITH REFERENCE TO THE DRAWINGS

Figure 1:
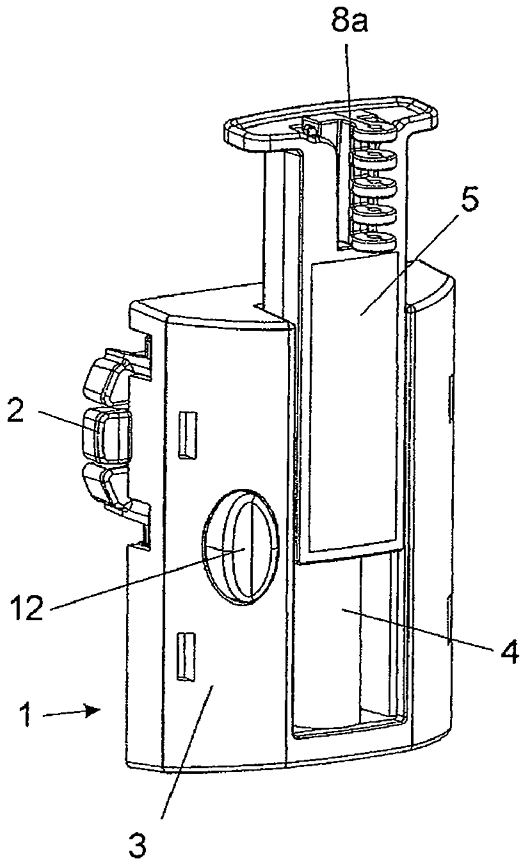
FIG. 1 is a perspective view of one form of tensioner according to the invention with the tensioning member in its extended position towards which it is resiliently biased.
Figure 2:
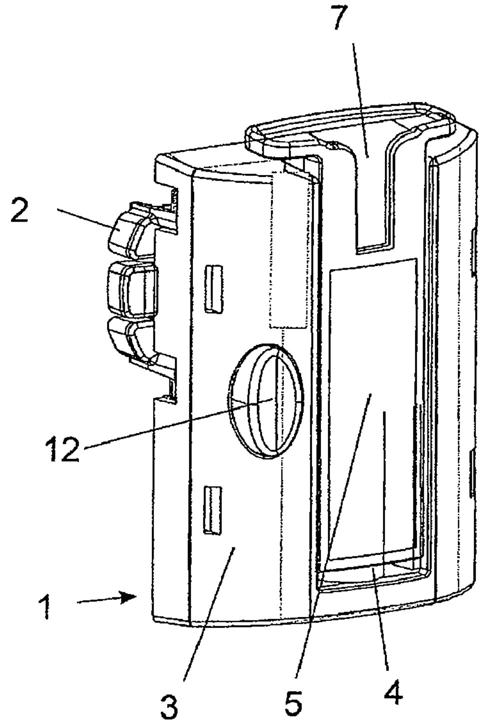
FIG. 2 is a similar view of the tensioner with the tensioning member retracted against the spring loading thereof and with the part of a fitting shown in FIG. 1 removed therefrom.
Figure 3:
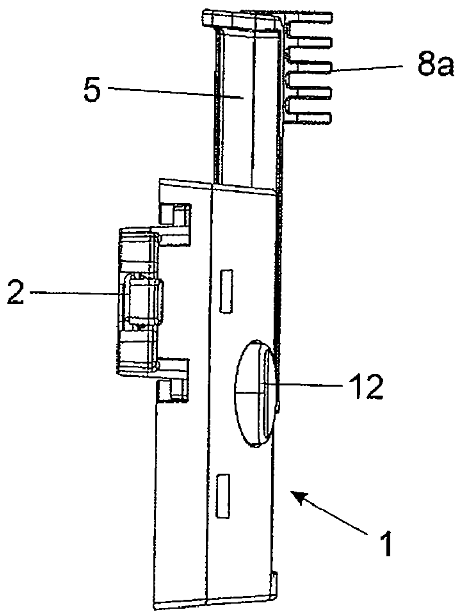
FIG. 3 is a side view of the tensioner in the condition illustrated in FIG. 1.
Figure 4:
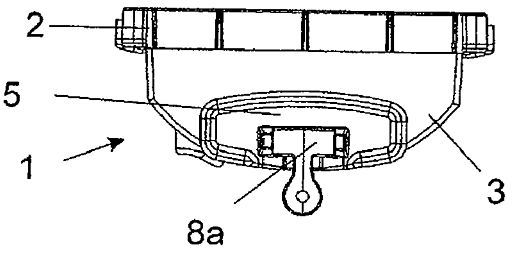
FIG. 4 is a plan view of the tensioner in the condition illustrated in FIG. 1.
Figure 5:
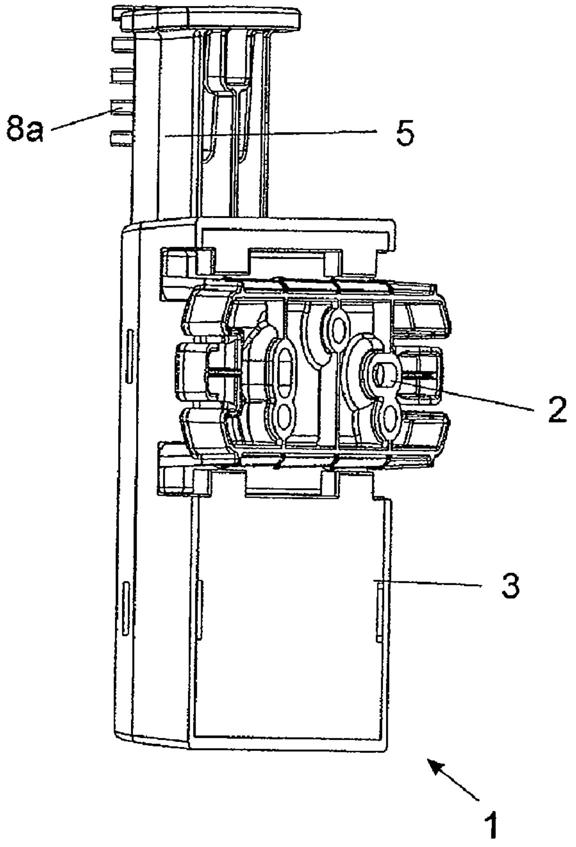
FIG. 5 is a perspective view of the tensioner illustrated in FIG. 1 from the rear thereof and showing particularly the baseplate.
Figure 6:
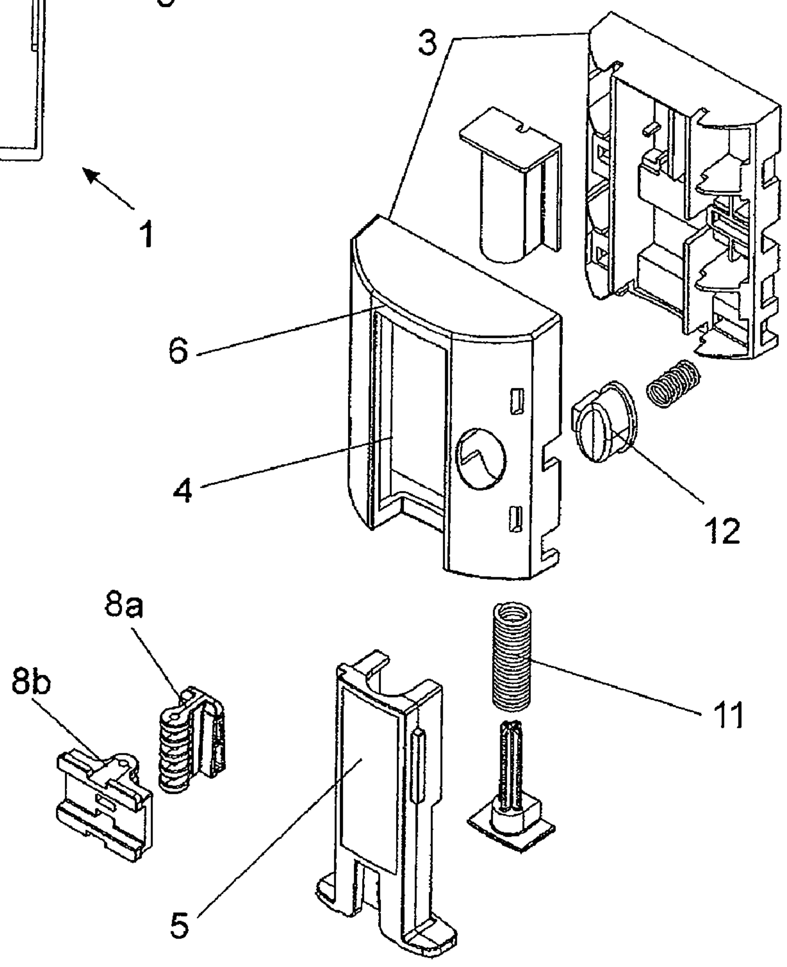
FIG. 6 is an exploded perspective view of the tensioner from the front thereof.

In the illustrated embodiment of the invention, a tensioner (1) is adapted to be attached to a support structure by way of a baseplate (2) from which the tensioner is conveniently releasably detachable. Each tensioner has a body (3) that is generally rectangular in shape and has formed therein a longitudinally extending track (4) that receives a longitudinally slidable tensioning member (5) that is confined to movement between an outwardly projecting terminal position that is illustrated in FIG. 1 and a retracted terminal position that is illustrated in FIG. 2. For this purpose the one end (6) of the track is closed and the other end open to allow the tensioning member to pass through it. The plane in which the tensioning member is slidable is parallel to the plane to which the baseplate (2) would be supported, in use.

The operatively outer end of the tensioning member has an inwardly lipped socket (7) for receiving a headed fitting that conveniently forms one part (8*a*) of a hinge, the other part (8*b*) of which is to be attached, in one way or another, to the display panel (9) to be supported, in use. As will be apparent from the following, it is preferred that such fitting be attached to a substantially rigid batten (10) towards each end thereof so that each batten is supported at or towards its two ends by two tensioners, in use.

The tensioning member (5) is, in this embodiment of the invention, biased by means of a spring (11) towards its outwardly extended terminal position that is illustrated in FIG. 1. A spring loaded pushbutton operated catch (12) is provided to releasably retain the tensioning member in its retracted, spring loaded, position that is illustrated in FIG. 2.

Figure 7:
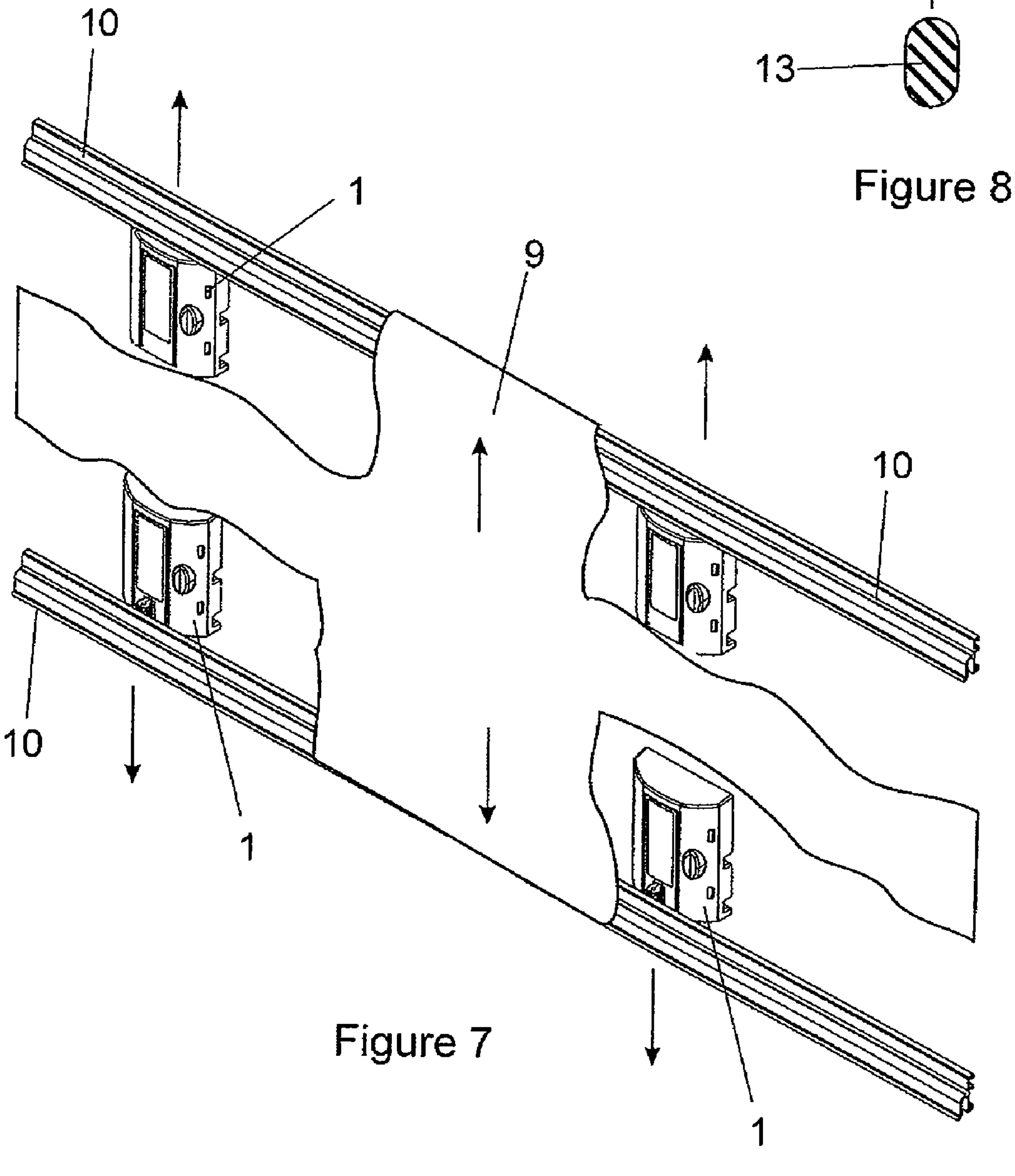
FIG. 7 is a perspective view illustrating an assembly including four tensioners secured to a surface for the purpose of suspending a display panel between them.

In preparation for use, typically four of the tensioners described above would be used in an assembly that is depicted schematically in FIG. 7. In such an instance the tensioners could have their bases secured to a flat wall so that they are arranged in pairs, typically two at the top of a display panel and two at corresponding positions at the bottom of the display panel, so that the tensioning members are movable generally vertically and in opposite directions relative to the corresponding tensioning member of the upper or lower pair.

Figure 8:
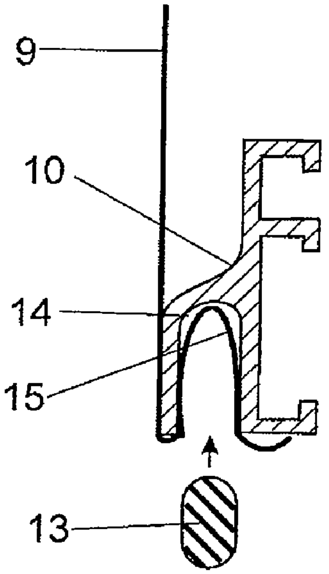
FIG. 8 is a schematic sectional end view of a batten employed in the assembly illustrated in FIG. 7; and, FIG. 9 is a perspective illustration showing an alternative assembly in which the tensioners are employed on a collapsible frame assembly.

As indicated above, it is preferred that a display panel have fitted to its upper and lower ends, a substantially rigid batten (10). The battens could be of a suitable aluminium extrusion, such as is illustrated in FIG. 8, and may be attached to a display panel by way of a caulking strip (13) being introduced into a groove (14) in the batten in order to anchor an end (15) of the fabric of the display panel. Whilst the battens may be entirely straight, it is preferred, where appropriate, that they be somewhat convexly arcuate in shape so that a flexible display panel is held in a slightly convex plane in plan view.

In order to carry out the installation of the display panel, the tensioning members are all arranged to be in their retracted positions and the fittings are used to attach the battens to them. The spring loaded catches are then released so that the tensioning members are all urged outwards with the result that the display panel is held under tension between the upper and 15 lower pairs of tensioners.

Figure 9:
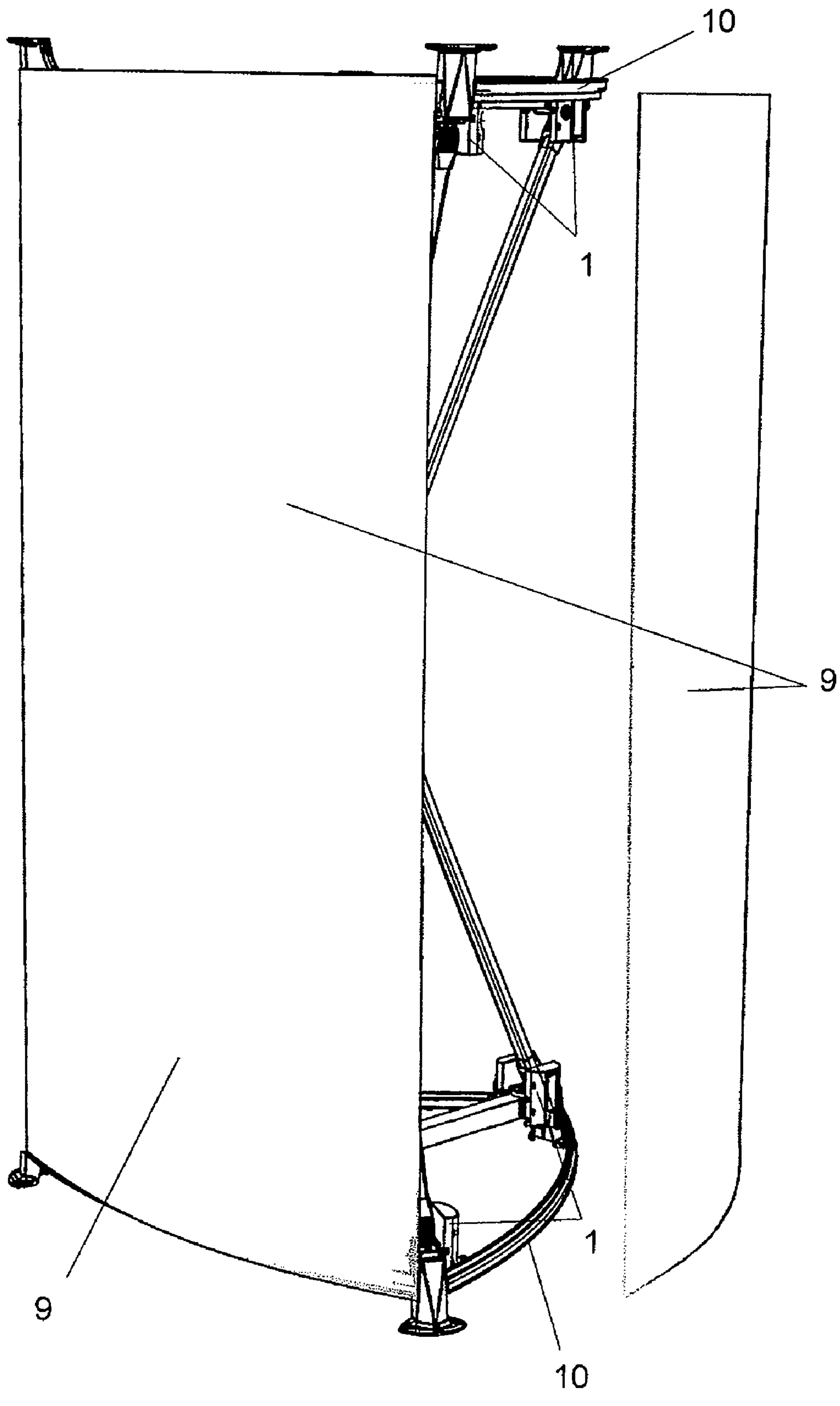

Of course, the support structure may assume any form and simply for the sake of completeness, there is illustrated in FIG. 9, the use of tensioners according to the invention on a collapsible and easily transportable frame that 20 is used for supporting display panels intermittently and from place to place.

It will be understood that numerous variations may be made to the embodiment of the invention described above as well as to be assemblies thereof, without departing from the scope of this invention.

The invention claimed is:

1. A tensioner comprising:

a body having attachment formations whereby it may be secured to a support structure;

an elongate tensioning member;

a track formed in the body;

a resilient biasing means;

attachment means for releasably attaching a display panel assembly to the tensioning member; and a fitting which is releasably secured to the elongate tensioning member, said fitting including a hinge, wherein the track is configured to receive the elongate tensioning member that is longitudinally movable along the track between terminal positions with the tensioning member being movable in a plane generally parallel to a plane in which a display panel is to be supported thereby, wherein the resilient biasing means is configured to urge the tensioning member towards one terminal position thereof relative to the track, wherein the hinge includes a first part which releasably engages the elongate tensioning member and extends from a face of the elongate tensioning member in a direction perpendicular to the movement of the elongate tensioning member along the track and a second part which engages the first part.

2. A tensioner as claimed in claim 1, wherein the elongate tensioning member, in one terminal position thereof, projects outwards from the body whilst in the other terminal position thereof the elongate tensioning member is substantially withdrawn into the body.

3. A tensioner as claimed in claim 1, wherein the track extends along substantially the entire length of the body.

4. A tensioner as claimed in claim 1, wherein the attachment means for releasably attaching the display panel assembly to the elongate tensioning member includes an inwardly lipped socket extending inwards from an operatively outer end of the tensioning member in the general direction of the length thereof.

5. A tensioner as claimed in claim 1, wherein the resilient biasing means biases the tensioning member towards said outwardly projecting position relative to the body.

6. A tensioner as claimed in claim 1, further comprising a manually releasable catch for arresting the tensioning member in the terminal position relative to the body in which the resilient biasing means urges the tensioning member towards the other terminal position so as to render the tensioning member spring loaded.

7. A tensioner as claimed in claim 1, wherein the attachment formations on the body are adapted to cooperate releasably with a baseplate that, in turn, can be permanently or semi-permanently secured to the support structure.

8. A tensioner as claimed in claim 1, wherein the hinge includes a first plurality of projections configured to extend in a direction perpendicular to the plane in which the display panel is to be displayed.

9. A tensioner as claimed in claim 8, wherein the hinge includes a second plurality of projections configured to engage the first plurality of projections.

10. A tensioner as claimed in claim 1, wherein the body of the tensionser is configured to be fixed to the support structure and not movable in a direction parallel to the longitudinal direction of the track.

11. A tensioner as claimed in claim 8, wherein the support structure is a wall.

12. A tensioner as claimed in claim 1, wherein a first end of the track is closed and a second end of the track, which is opposite the first end of the track, is open and configured to allow the elongate tensioning member to pass out of the second end of the track.

13. A tensioner as claimed in claim 7, wherein the attachment formations of the body, which are adapted to cooperate releasably with the baseplate, are positioned on a face of the body that is opposite the track.

14. A tensioner as claimed in claim 13, wherein attachment formations of the body includes two parallel grooves configured to engage and support at least a portion of the baseplate.

15. A tensioner as claimed in claim 7, wherein the plane in which the elongate tensioning member is slidable is parallel to the plane in which the baseplate longitudinally extends.

16. A tensioner as claimed in claim 6, wherein the body of the tensioner includes a front face and a rear face, wherein the track is position centrally in the front face and the manually releasable catch for arresting the tensioning member is positioned in the front face adjacent the track.

17. A tensioner as claimed in claim 1, wherein the second part of the hinge includes an engaging portion which is positioned opposite the second plurality of projections, wherein the engaging portion of the hinge is configured to engage a display panel or a batten which is configured to support a display panel.

18. A tensioner for tensioning a display panel, comprising:

a body which is configured to be attached to a support structure;

a track formed in the body;

an elongate tensioning member which is configured to be guided by said track for longitudinal reciprocal movement along said track between an extended position and a retracted position;

a resilient biasing means urging said elongate tensioning member towards the extended position;

a catch configured to releasably secure the elongate tensioning member in the retracted position; and a fitting configured to be engaged with the elongate tensioning member and movable with said elongate tensioning member, wherein the fitting is configured to secure a panel to the elongate tensioning member, wherein the fitting includes a hinge and the hinge includes a first part configured to engage the elongate tensioning member and a second part configured to engage the display panel or a batten which is configured to support a display panel.

* * * * *